United States Patent Office 2,880,222
Patented Mar. 31, 1959

2,880,222
ORGANIC DITHIOL DERIVATIVES

Ernst A. H. Friedheim, New York, N.Y.

No Drawing. Application February 6, 1957
Serial No. 638,464

7 Claims. (Cl. 260—430)

This invention relates to organic dithiol derivatives of metal-containing compounds and has particular relation to reaction products of metal-containing compounds with dimercapto derivatives of 2,3-dimercaptosuccinic acid or 2,3-dimercaptosuccinic acid compounds of the type described hereinafter. The invention also includes processes for preparing the above mentioned reaction products.

The preferred compounds of the present invention are reaction products of metal-containing compounds with free 2,3-dimercaptosuccinic acid or 2,3-dimercaptosuccinic acid compounds, and have the following general formula:

(I)
$$\begin{array}{c} \text{COOX} \\ | \\ \text{HC}-\text{S} \\ | \quad\quad\quad \text{Me} \\ \text{HC}-\text{S} \\ | \\ \text{COOX}' \end{array}$$

In the above formula X and X' may be equal or different and stand for H, Na, K, $NH_4$, Li, Ca, Mg, or the radical of diethylamine ($-N(C_2H_5)_2$) or N-methyl-glucamine $$(CH_2OH-(CHOH)_4-CH_2-\underset{|}{N}-CH_3)$$

Me stands either for =Hg, or for a radical of Au, Bi or Sb of the formula =AuY, =BiY or =SbY, wherein Y stands for —OH or an inorganic acid radical; or for a radical of an organic compound; or for an —SR radical, in which R is an inorganic atom or group or a residue or radical of an aliphatic or aromatic compound.

Thus, compounds embodying the present invention have, for example, one of the following formulas:

(II) 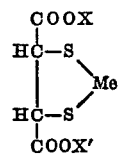

(III) 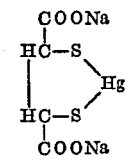

(IV) 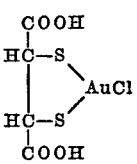

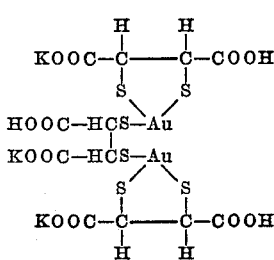

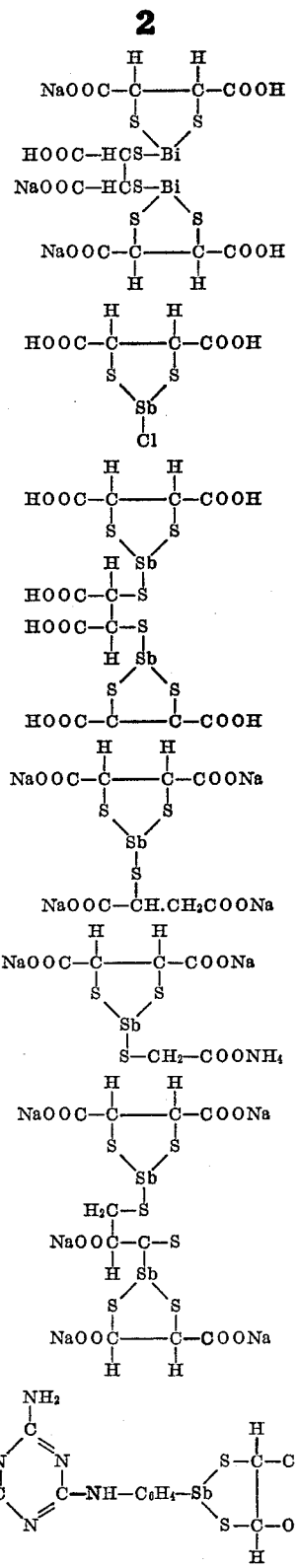

In order to prepare the reaction products embodying the present invention, suitable compounds of metals, such as salts, complex compounds, oxides, hydroxides, or organometallic compounds, are reacted with the dimercapto compound in a liquid reaction medium. 2,3-dimercaptosuccinic acid is preferably used in form of aqueous solutions of its salts. The latter can be formed from the acid and hydroxides, bicarbonates, carbonates of alkali metals, hydroxides of alkaline earth metals, ammonia, organic bases, such as methylamine, ethylamine, diethylamine, diethanolamine, piperidine, amidines, such as pentamidine, and the like. Monobasic and dibasic salts of 2,3-dimercaptosuccinic acid can be used. The reaction can be carried out also in organic solvents. For example, $HgCl_2$ can be reacted in methanol with free 2,3-dimercaptosuccinic acid. The 2,3-dimercaptosuccinic acid derivatives embodying the present invention may be prepared in the form of free acids, acid salts and neutral salts.

The reaction products can be isolated from the reaction mixture by evaporation of the reaction liquid or by precipitation with suitable reagents or suitable organic solvents.

*Example 1.*—1 mol of freshly precipitated $Sb(OH)_3$ is suspended in an aqueous solution of 1.5 mols of 2,3-dimercaptosuccinic acid and 3 mols of $NaHCO_3$ and agitated until the $Sb(OH)_3$ is dissolved. After filtration and adjustment to the desired concentration, the solution can be used for therapeutic administration. The reaction product can be isolated by evaporation of the liquid reaction medium in vacuo or by precipitation with acetone or another water-miscible organic solvent. The free acid derivative corresponding to the above Formula VI, can be isolated by precipitation with HCl from the reaction mixture. The acid K salt can be obtained by dissolving the free acid derivative in aqueous potassium acetate solution and precipitation with alcohol. By using instead of potassium acetate the acetate of lithium or calcium, salts of these metals are obtained. By dissolving the free acid in aqueous diethylamine or in aqueous N-methylglucamine, the corresponding salts of these organic bases are formed and can be isolated by precipitation with alcohol. $Sb(OH)_3$ may be also reacted with free 2,3-dimercaptosuccinic acid by suspending $Sb(OH)_3$ and the free acid in methanol and reacting them under stirring at ordinary or moderately elevated temperature, e.g. 50°–60° C. A soluble reaction product is thus formed which separates upon evaporation in vacuo. The mono-Na or mono-K salt can be obtained by precipitation with the corresponding alkali acetate added to the methanol solution.

*Example 2.*—1 mol of tartar emetic is dissolved in an aqueous liquid prepared by dissolving 1.6 mol of 2,3-dimercaptosuccinic acid and 1.6 mol of $Na_2CO_3$. The resulting solution is filtered in order to remove mechanical impurities as well as bacteria and is then suitable for therapeutic administration to human patients or animals. The free acid derivative and the acid alkali salt can be obtained in the same manner as in Example 1.

*Example 3.*—1 mol of bismuth ammonium citrate is dissolved in water and to the solution 1.5 mols of the disodium salt of 2,3-dimercaptosuccinic acid, dissolved in water, are added. The resulting solution is filtered and adjusted to a pH=7.0 and is then suitable for therapeutic administration.

*Example 4.*—1 mol of freshly precipitated $Bi(OH)_3$ is suspended in an aqueous solution of 1.5 mols of the disodium salt of 2,3-dimercaptosuccinic acid and the mixture is stirred until the $Bi(OH)_3$ is dissolved. Further treatment of the solution thus obtained substantially corresponds to that described in Example 1.

*Example 5.*—To an aqueous solution of 1 mol of mercuric acetate, an aqueous solution of 1 mol of free 2,3-dimercaptosuccinic acid and 2 mols of sodium acetate are added. After filtration, the reaction product can be isolated by precipitation with alcohol.

A similar reaction product representing the free acid derivative, is obtained by precipitation of the above described dissolved reaction product with HCl or by reacting $HgCl_2$ dissolved in methanol, with free 2,3-dimercaptosuccinic acid and subsequent evaporation.

*Example 6.*—1 mol of freshly precipitated $Sb(OH)_3$ is dissolved under stirring in an aqueous solution of 1 mol of the monosodium salt of 2,3-dimercaptosuccinic acid. The reaction product formed corresponds to the formula (XI)
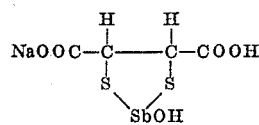

By adding to the solution of this product 1 mol of the sodium salt of thioglycolic acid, dissolved in water, a compound corresponding to the following formula is formed:

(XII)
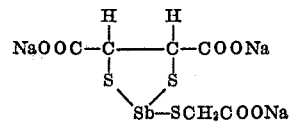

Compounds corresponding to the above Formulas VII and IX can be prepared in analogous manner, due consideration being given to the molar proportions of the reactants.

*Example 7.*—0.1 mol of disodium p-melaminyl-phenylstibonate is stirred into a solution of 0.25 mol of the disodium salt of dimercaptosuccinic acid. The reaction mixture is kept at 40° C., and stirring is continued for about 40 minutes. The reaction mixture is now filtered and evaporated under reduced pressure to dryness. The residue contains the product corresponding to Formula X. It is purified by repeated acid precipitations from aqueous alkaline solutions. The final product corresponding to Formula X can be obtained by alcohol precipitation of a substantially neutral aqueous solution of the purified product.

*Example 8.*—1 mol of antimony acetate of the formula $Sb(CO_2CH_3)_3$ is stirred into a hot solution of 1 mol of 2,3-dimercaptosuccinic acid in methanol. The resulting solution is filtered and saturated with anhydrous sodium acetate. A white precipitate is formed which is filtered off and dried in vacuo. The product corresponds to the formula

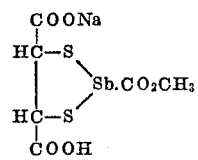

The compound is very soluble in water to give a colorless clear solution of a pH of 4–5. This compound can be reacted with a neutral salt of thioglycolic acid, thiomalic acid, or dimercaptopropionic acid in order to form the compounds corresponding to the above Formulas VIII, VII and IX, respectively.

Furthermore, dimercapto derivatives of other organometallic compounds can be prepared by reacting with 2,3-dimercaptosuccinic acid or its salts, substantially in the manner described in the above examples, for example monosodium p-aminophenylstibonate and monosodium acetylaminophenylstibonate. In the treatment of Sb compounds containing a pentavalent metal atom connected to a C atom, I prefer to reduce them first with an organic monothiol, for example ammonium thioglycolate and subsequently react the trivalent monothiol derivative with the 2,3-dimercaptosuccinic acid compound. The pentavalent metal compounds may also be reduced to the corresponding trivalent derivatives and condensed with dimercaptosuccinic acid in one operation, by reaction with at least 2.5 mols of dimercaptosuccinic acid.

*Example 9.*—$AuCl_3HCl$ and 2,3-dimercaptosuccinic acid are reacted in methanol in the molecular proportion of 2:3. The solution thus obtained is evaporated to dryness, under vacuum, and the dry residue is dissolved in an aqueous acetate solution e.g. acetate of sodium, potassium, lithium, calcium or magnesium. By precipitation of the filtered solution with alcohol, a compound corresponding to Formula IV is obtained.

*Example 10.*—1 mol of Au(NH₂)₂Cl (diamide aurichloride) is suspended in an aqueous solution of 1.5 mols of the disodium salt of 2,3-dimercaptosuccinic acid and the reaction mixture is stirred until the gold compound is dissolved.

The 2,3-dimercaptosuccinic acid can be prepared by reacting acetylene-dicarboxylic acid with 2 molecules of thioacetic acid (CH₃COSH) to form the corresponding dithioacetyl esters which can be readily hydrolyzed to the corresponding dithiols. For example, 10 grams of the acetylene dicarboxylic acid are dissolved in 30 ml. of ethyl acetate and 13.3 g. of thioacetic acid are gradually added under cooling and stirring. Stirring is continued first in an ice bath for about 3 hours and then at 15° to 25° C. for further 3 hours. The resulting precipitate is separated and heated in dilute aqueous HCl to about 90° C. until the 2,3-dimercaptosuccinic acid separates in the form of white crystals having a melting point of 192°–193° C.

*Example 11.*—100 grams of pure 2,3-dimercaptosuccinic acid are dissolved in a solution consisting of 38 grams of sodium acetate trihydrate and 180 grams of magnesium acetate tetrahydrate in 1000 cc. of water. The resulting solution is filtered and 55 grams of Sb₂O₃ are added. Stirring is continued for 3 hours in order to complete the reaction, at room temperature of for example 20° C.

The reaction mixture is filtered and the clear filtrate is precipitated by a water-miscible organic solvent or solvent mixture, e.g. by introducing the reaction mixture into a mixture of equal volumes of methanol and isopropanol under vigorous stirring.

The precipitate formed is filtered and washed with four portions of the methanol-isopropanol mixture and finally with isopropanol.

After washing the product is placed in a vacuum dryer and dried at 40–60° C. under vacuum of about 10 mm. mercury.

In this condition the product represents a stable white powder which readily dissolves in 5 parts of water to a clear solution having a pH of 6–7. Its empirical formula is: C₁₂H₆O₁₂S₆Sb₂Mg₂.₅Na and it has a molecular weight of 861. The product can exist in various states of hydration.

*Example 12.*—³/₁₀ gram mol of dimercaptosuccinic acid and ¹/₁₀ gram mol of Sb₂O₃ are suspended in 540 cc. of propylene glycol and heated with stirring for 2 hours at 65° C. 540 cc. of isopropanol are then added. The filtered reaction mixture is run with stirring into a suspension of ³/₁₀ mol of anhydrous magnesium acetate in 300 cc. of ethanol. A white precipitate is formed, which is filtered off, washed with ethanol, isopropanol and isopropylether and dried in vacuum at 60° C. The compound has the formula (dimercaptosuccinic acid radical)₃Sb₂Mg₃. It may contain in occluded form 4 mols of propylene glycol.

The compounds embodying the present invention have valuable therapeutic properties. They can be used for the treatment of the diseases mentioned hereinafter and are distinguished by low toxicity and reduced side effects in comparison with known compounds containing the respective metals.

The antimony compounds according to the present invention can be used, for example, in the treatment of urinary and intestinal bilharziasis. For example, in using the neutral or acid salt of the compound corresponding to the above Formula VI for the treatment of urinary and intestinal bilharziasis in human patients, this compound can be administered by intravenous or intramuscular injection. Such injections can be administered e.g. at the rate of one per day on 3 to 12 consecutive days. The preferred single dose for adults for both injection routes ranges from 0.2 to 0.5 gram and the total dose is from 1.6 to 2.8 g. of the acid or neutral Na or Mg salt of the compound corresponding to the above Formula VI, depending on the condition of the patient. In an intensive 2 day treatment a total dose of approximately 2 grams can be given in 6 intravenous or intramuscular injections in intervals of 8 hours, whereby each injection corresponds to about 0.33 g. of the compound. The side effects observed were not serious and they were minor in comparison with the use of known Sb compounds, such as tartar emetic and stibophen, under comparable conditions.

The value of relative toxicity of Sb in the compounds embodying the present invention, e.g. the acid potassium salt of the compound corresponding to the above Formula VI is 1/50 when compared with the relative toxicity 1/1 of Sb in tartar emetic under otherwise equal conditions. Under the same conditions, the relative toxicity of Sb in stibophen corresponds to 1:4.9, in comparison with 1:50 for said compound of the present invention and 1:1 for tartar emetic.

These values of relative toxicity, which were determined by determining the LD50 of the compounds to be compared, by intraperitoneal injection in mice, show the unexpected significant drop of toxicity obtained by replacing the O—Sb bond by the Sb—S bond in the manner taught by the present invention.

The mercury compounds according to the present invention, e.g. a compound corresponding to the formula

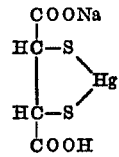

are likewise characterized by reduced toxicity and the lack of side effects or reduced side effects. The compound of the above formula can be used as a diuretic e.g. by intramuscular injection in 5% aqueous solution, 1 cc. of which contains 0.025 g. of Hg. In contrast to many other compounds, they are active and well tolerated in administration per os. The other details of administration as a diuretic correspond to the conventional administration of other Hg-containing diuretics.

As examples of the therapeutic applications of compounds embodying the present invention and containing, as the metallic component of the molecule, Au^III, or Bi^III, the following is mentioned.

The compounds containing Au^III can be used in the treatment of rheumatic disorders and administered by intramuscular injection, the daily adult dose being in the range of 1–50 mg. of metallic gold, depending on the age and condition of the patient.

The compounds containing Bi^III can be used in the treatment of yaws either by oral administration in the form of capsules or keratinized tablets, containing 0.15 g. of Bi per capsule or tablet, or by intravenous administration of a solution in water, said solution containing e.g. 13 mg. of Bi per cc. In oral administration single oral doses are applied in the range of 0.01–0.05 g./kg. of Bi and such doses are administered daily for up to 10 days. In intravenous administration of the above mentioned solution 4 daily doses each corresponding to 0.0015 g./kg. of Bi with a ceiling of 0.070 g. of Bi can be administered for up to 14 days at 2 day intervals. It has been found that the effective and the toxic doses in intravenous administration of these Bi-compounds are sufficiently different in order to permit safe administration without undue toxic effects.

Other details (not specifically mentioned above) of the therapeutic administration of the compounds of the invention correspond to the conventional procedures for the treatment of the above mentioned diseases.

In all compounds embodying the present invention, the respective metals show an unexpectedly reduced toxicity, high tolerance and therapeutic effects. Due to their reduced toxicity and side effects, at simultaneously high therapeutic effect, it is, for example, possible to successfully treat with the Sb-compounds of the present invention urinary as well as intestinal bilharziasis in essentially shorter periods of time and with an essentially higher percentage of healings than in the use of known Sb-compounds, such as tartar emetic, stibophen and anthiomaline.

Reference is made to the co-pending application filed in my name under Ser. No. 319,779, November 10, 1952, now abandoned, of which this is a continuation-in-part.

What is claimed is:

1. As a new compound, the dimercapto derivative of a metal-containing compound, corresponding to the general formula

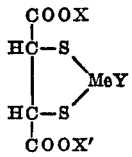

wherein X and X' are selected from the group consisting of H, Li, K, Ca, Mg, Na, NH$_4$, diethylamine and N-methylglucamine radicals; Me stands for an element selected from the group consisting of Sb, Bi and Au; and Y is selected from the group consisting of monovalent radicals of inorganic acids, mercapto radicals, radical of p-melaminyl-phenylstibonate, radical of acetylaminophenylstibonate, radical of tartar emetic, radical of bismuth ammonium citrate, acetyl radical, radical of diamide aurichloride, radical of dimercaptosuccinic acid and radicals of the following formulae

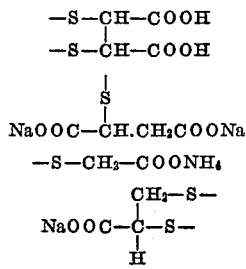

2. A new dimercapto derivative as claimed in claim 1, in which Me stands for Sb.

3. A new dimercapto derivative as claimed in claim 1, in which Me stands for Bi.

4. A new dimercapto derivative as claimed in claim 1, in which Me stands for Au.

5. A new dimercapto derivative as claimed in claim 2, in which X and X' stand for $$\frac{-Mg-}{2}$$

6. A new compound corresponding to the formula

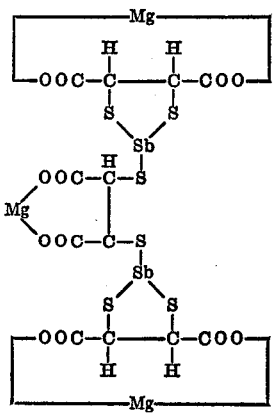

7. A new compound corresponding to the formula

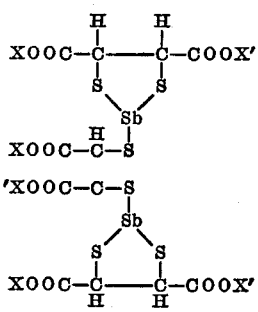

wherein X and X' are selected from the group consisting of H, Li, K, Ca, Mg, NH$_4$ and diethylamine and N-methylglucamine radicals.

References Cited in the file of this patent

UNITED STATES PATENTS

| 2,629,724 | Clemence | Feb. 23, 1953 |
| 2,659,723 | Friedheim | Nov. 17, 1953 |
| 2,664,432 | Friedheim | Dec. 29, 1953 |

OTHER REFERENCES

Clark, Chem. Soc. Jour. (London), 1932, pp. 1826 to 30.

Christiansen: Organic Derivatives of Antimony, New York, 1925, pp. 94 and 99.